No. 802,907. PATENTED OCT. 24, 1905.
J. T. BOYET.
NUT LOCK.
APPLICATION FILED MAR. 7, 1905.

Witnesses

Inventor
John T. Boyet,
By Victor J. Evans
Attorney

UNITED STATES PATENT OFFICE.

JOHN T. BOYET, OF LEWISBURG, TENNESSEE.

NUT-LOCK.

No. 802,907.

Specification of Letters Patent.

Patented Oct. 24, 1905.

Application filed March 7, 1905. Serial No. 248,843.

*To all whom it may concern:*

Be it known that I, JOHN T. BOYET, a citizen of the United States, residing at Lewisburg, in the county of Marshall and State of Tennessee, have invented new and useful Improvements in Nut-Locks, of which the following is a specification.

This invention relates to a nut-lock of that type in which a nut carrying a dog or pawl is fitted to a bolt longitudinally grooved, said grooves engaging the dog or pawl on the nut to prevent the nut from being unintentionally turned in reverse direction, whereby it may become disengaged from the bolt. The nut is also provided with means for disconnecting the dog or pawl from the engaged notch when the nut is to be removed from the bolt.

Figure 1:
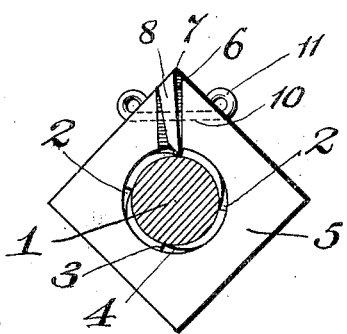
Figure 2:
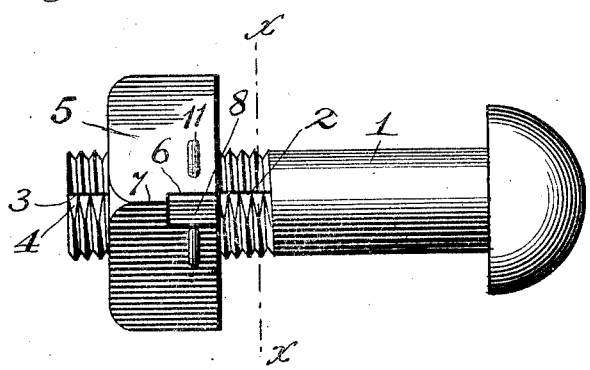
Figures 3, 4:
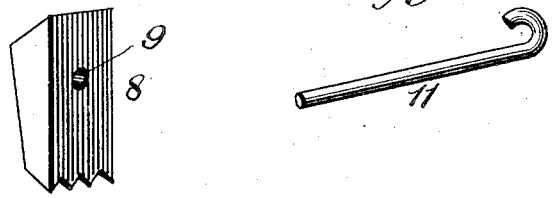

In the accompanying drawings, forming part of this specification, Figure 1 is a face view of the improved nut and its locking means with the grooved bolt shown in cross-section. Fig. 2 is a side view of the nut and bolt in operative relation to each other. Figs. 3 and 4 are perspective views of certain detail parts.

Similar reference-numerals indicate corresponding parts in the different views.

The numeral 1 indicates a bolt of well-known form, across the threaded end of which are a plurality of longitudinal grooves 2, having a depth about that of the thread and varying in number as circumstances demand. Each groove 2 is made with a straight face 3 and a curved face 4, as shown.

The nut (indicated by 5) may be square, hexagonal, or of other form, in one or both faces of which a radial groove 6 is made extending from the threaded bore of the nut, preferably, to one of its angles or corners, as 7. Seated in the groove 6 is a dog 8, notched at its lower end to fit the thread of the bolt 1 and extending, preferably, to the edge of the nut, gradually widening toward the outer end. A small hole 9 is bored through the dog 8, which when the dog is in position is in line with a hole 10 through the nut 5, near the corner 7. The dog is retained in place by means of a pin 11, inserted through the holes 9 and 10 and having its ends bent, as represented in Fig. 1. The pin is preferably furnished with one end turned up, as in Fig. 4, the other end being bent after inserting it in the nut. The dog 8 is inclined to a radial line from the center of the bolt, so that when the nut is turned in one direction the dog will yield, but on an attempt to rotate it in the opposite direction the toothed end of the dog, which lies in the groove 2, will engage the bolt behind the radial face 3 of the groove and prevent the nut from being turned. When it is desired to remove the nut from the bolt, one end of the pin 11 is straightened or cut off and the remaining portion driven out of the nut. The dog is then free to be withdrawn and the nut removed from the bolt.

Having thus described the invention, what is claimed as new, and desired to be secured by Letters Patent, is—

In a nut-lock, a longitudinally-grooved bolt, combined with a nut having a radial slot in its face extending from the bolt-hole to its periphery, and a hole through the bolt near said corner, a dog in said slot angularly disposed thereto, and a pin passing through a hole in the dog and the hole in the nut, the ends of said pin bent to prevent its withdrawal.

In testimony whereof I have affixed my signature in presence of two witnesses.

JOHN T. BOYET.

Witnesses:
 HOMER T. HARRIS,
 OTEY M. REED.